US012156011B2

(12) United States Patent
Katayama et al.

(10) Patent No.: US 12,156,011 B2
(45) **Date of Patent: *Nov. 26, 2024**

(54) AUDIO MIXING DEVICE AND ELECTRONIC DEVICE

(71) Applicant: SEIKO EPSON CORPORATION, Tokyo (JP)

(72) Inventors: Takao Katayama, Matsumoto (JP); Fumihito Baisho, Kai (JP); Tsutomu Nonaka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 344 days.

This patent is subject to a terminal disclaimer.

(21) Appl. No.: 17/846,392

(22) Filed: Jun. 22, 2022

(65) Prior Publication Data

US 2022/0417688 A1 Dec. 29, 2022

(30) Foreign Application Priority Data

Jun. 25, 2021 (JP) ................................ 2021-105401

(51) Int. Cl.
*H04S 3/00* (2006.01)

(52) U.S. Cl.
CPC .............. *H04S 3/006* (2013.01); *H04S 3/008* (2013.01)

(58) Field of Classification Search
CPC ................................ H04S 3/006; H04S 3/008
See application file for complete search history.

(56) References Cited

U.S. PATENT DOCUMENTS

| | | | | |
|---|---|---|---|---|
| 9,646,586 | B2 * | 5/2017 | Shirai | G10H 1/0091 |
| 11,288,033 | B2 * | 3/2022 | Sun | H04N 21/4394 |
| 2013/0031287 | A1 | 1/2013 | Miyake | |
| 2015/0363155 | A1 | 12/2015 | Hayashi et al. | |
| 2017/0288798 | A1 * | 10/2017 | Saito | H04S 3/008 |
| 2019/0138262 | A1 * | 5/2019 | Becherer | G06F 3/165 |
| 2019/0191261 | A1 * | 6/2019 | Saito | H04S 7/30 |
| 2022/0147310 | A1 * | 5/2022 | Sato | G06F 3/04847 |
| 2022/0345820 | A1 * | 10/2022 | Dickins | H04R 1/403 |
| 2023/0419982 | A1 * | 12/2023 | Travaglini | G10L 25/78 |

FOREIGN PATENT DOCUMENTS

| | | |
|---|---|---|
| JP | 2013-029977 A | 2/2013 |
| JP | 2014-137790 A | 7/2014 |
| WO | 2014/111988 A1 | 7/2014 |

* cited by examiner

*Primary Examiner* — David L Ton
(74) *Attorney, Agent, or Firm* — Rankin, Hill & Clark LLP

(57) ABSTRACT

An audio mixing device includes: a gain setting circuit configured to set first to n-th gains based on a command input from the outside, n being an integer of 2 or more; and a mixing circuit configured to output a mixing signal obtained by mixing two or more of first to n-th multiplication data obtained by respectively multiplying first to n-th audio data by the first to n-th gains.

17 Claims, 11 Drawing Sheets

*FIG. 3*

61

| CHANNEL | PRIORITY |
|---|---|
| Ch1 | Pr7 |
| Ch2 | Pr5 |
| Ch3 | Pr9 |
| Ch4 | Pr12 |
| Ch5 | Pr6 |
| Ch6 | Pr2 |
| Ch7 | Pr10 |
| Ch8 | Pr11 |
| Ch9 | Pr1 |
| Ch10 | Pr3 |
| Ch11 | Pr8 |
| Ch12 | Pr4 |

62

| PRIORITY | GAIN SETTING VALUE |
|---|---|
| Pr1(High) | 0x00 |
| Pr2 | 0x0C |
| Pr3 | 0x18 |
| Pr4 | 0x24 |
| Pr5 | 0x30 |
| Pr6 | 0x3C |
| Pr7 | 0x48 |
| Pr8 | 0x54 |
| Pr9 | 0x60 |
| Pr10 | 0x6C |
| Pr11 | 0x78 |
| Pr12(Low) | 0x84 |

63

| GAIN SETTING VALUE | GAIN VALUE |
|---|---|
| 0x00 | 0dB |
| 0x01 | −0.25dB |
| 0x02 | −0.5dB |
| ⋮ | ⋮ |
| 0x0C | −3dB |
| ⋮ | ⋮ |
| 0x18 | −6dB |
| ⋮ | ⋮ |
| 0x24 | −9dB |
| ⋮ | ⋮ |
| 0x30 | −12dB |
| ⋮ | ⋮ |
| 0x3C | −15dB |
| ⋮ | ⋮ |
| 0x48 | −18dB |
| ⋮ | ⋮ |
| 0x54 | −21dB |
| ⋮ | ⋮ |
| 0x60 | −24dB |
| ⋮ | ⋮ |
| 0x6C | −27dB |
| ⋮ | ⋮ |
| 0x78 | −30dB |
| ⋮ | ⋮ |
| 0x84 | −33dB |
| ⋮ | ⋮ |
| 0xFD | −63.25dB |
| 0xFE | −63.5dB |
| 0xFF | nosound |

FIG. 7

64

| CHANNEL | PRIORITY |
|---|---|
| Ch2 | Pr1 |
| Ch3 | Pr2 |
| Ch4 | Pr3 |
| Ch5 | Pr4 |

AUDIO MIXING DEVICE AND ELECTRONIC DEVICE

The present application is based on, and claims priority from JP Application Serial Number 2021-105401, filed Jun. 25, 2021, the disclosure of which is hereby incorporated by reference herein in its entirety.

BACKGROUND

1. Technical Field

The present disclosure relates to an audio mixing device and an electronic device.

2. Related Art

JP-A-2014-137790 (Reference 1) discloses an audio output control device that acquires end time information related to an estimated time at which transmission of a meaningful content of earlier audio information is completed, acquires delay permissible information related to a permissible time of delay from a time when a request for outputting later audio information is made until the output of the later audio information starts, determines whether standby for outputting the later audio information is allowed according to a temporal relation between the end time information and the delay permissible information, stands by for outputting the later audio information under a condition that it is determined to be able to wait, and outputs the later audio information after preferentially executing the output of the earlier audio information.

In the device described in Reference 1, there is a concern that output of either the earlier audio information or the later audio information may be delayed even when both are important information that requires urgency, which may delay a necessary treatment by a user with respect to the audio information whose output is delayed.

SUMMARY

An aspect of an audio mixing device according to the present disclosure includes: a gain setting circuit configured to set first to n-th gains based on a command input from the outside, n being an integer of 2 or more; and a mixing circuit configured to output a mixing signal obtained by mixing two or more of first to n-th multiplication data obtained by respectively multiplying first to n-th audio data by the first to n-th gains.

An aspect of an electronic device according to the present disclosure includes the aspect of the audio mixing device.

BRIEF DESCRIPTION OF THE DRAWINGS

FIG. 3 is a diagram showing an example of a channel-priority setting table, a priority-gain setting table, and a gain reference table.

FIG. 7 is a diagram showing an example of a priority selection table.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessarily essential constituent elements of the present disclosure.

1. Audio Mixing Device

1-1. First Embodiment

Figure 1:
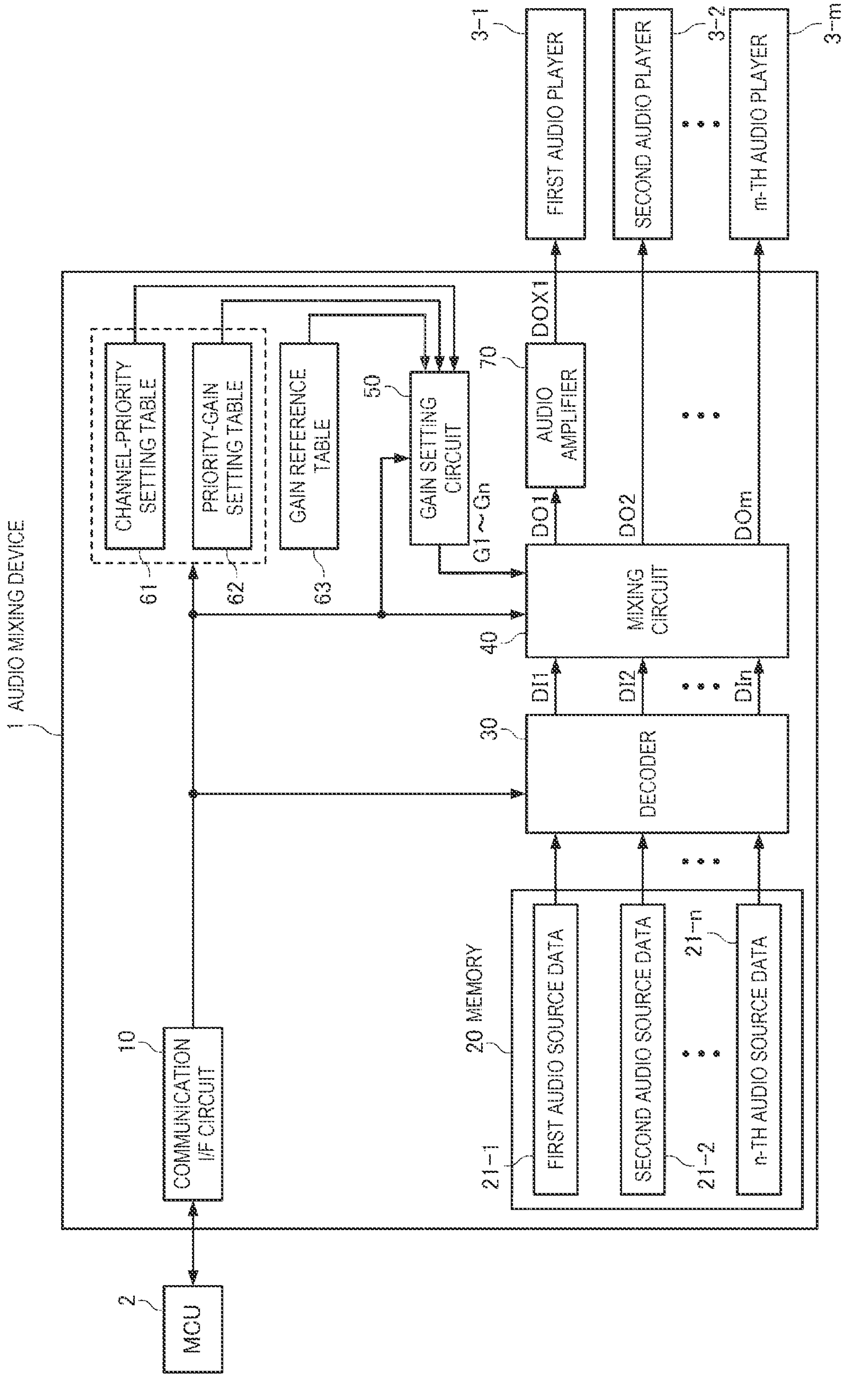
FIG. 1 is a diagram showing a configuration example of an audio mixing device according to a first embodiment.

FIG. 1 is a diagram showing a configuration example of an audio mixing device according to a first embodiment. As shown in FIG. 1, the audio mixing device 1 according to the first embodiment includes a communication interface circuit 10, a memory 20, a decoder 30, a mixing circuit 40, a gain setting circuit 50, a channel-priority setting table 61, a priority-gain setting table 62, a gain reference table 63, and an audio amplifier 70. The audio mixing device 1 may be a single-chip semiconductor integrated circuit device, or a multi-chip semiconductor integrated circuit device, or at least a part thereof may be configured with an electronic component other than the semiconductor integrated circuit device.

The memory 20 stores first to n-th audio source data 21-1 to **21-*n* which are n pieces of audio source data. That is, the first to n-th audio source data 21-1 to 21-*n* are stored in the memory 20. Here, n is an integer of 2 or more. The memory 20 may be, for example, a flash memory. The first to n-th audio source data 21-1 to 21-*n* may be, for example, pulse code modulated (PCM) audio data, or may be adaptive difference pulse code modulated (ADPCM) audio data. PCM is an abbreviation of pulse code modulation, and ADPCM is an abbreviation of adaptive differential pulse code modulation. The first to n-th audio source data 21-1 to 21-*n*** may be, for example, data that serves as a base of various kinds of sounds such as a sound imitating a voice when a person speaks, a mechanical warning sound, a sound effect, or the like.

The communication interface circuit 10 is a circuit that performs data communication with a microcontroller 2. The communication interface circuit 10 may be, for example, an SPI interface circuit or an I2C interface circuit. SPI is an abbreviation of serial peripheral interface, and I2C is an abbreviation of inter-integrated circuit.

The communication interface circuit 10 receives various commands transmitted from the microcontroller 2, and generates various control signals corresponding to the received commands. For example, when the communication interface circuit 10 receives an audio play command or an audio stop command for i-th audio source data 21-*i* of the first to n-th audio source data 21-1 to 21-*n* stored in the memory 20, the communication interface circuit 10 generates a control signal that instructs audio play or audio stop for the i-th audio source data 21-*i*, and outputs the control signal to the decoder 30 and the gain setting circuit 50. Further, for example, when the communication interface circuit 10 receives a data write command for the channel-priority setting table 61 or the priority-gain setting table 62, the communication interface circuit 10 generates a control signal for writing data designated by an address designated by the command.

The decoder 30 includes first to n-th input channels and first to n-th output channels. The decoder 30 reads the i-th audio source data 21-*i* from the memory 20 to an i-th input channel in response to the control signal that instructs audio play for the i-th audio source data 21-*i* output from the communication interface circuit 10, decodes the i-th audio source data 21-*i*, and demodulates i-th audio data DIi. As described above, the first to n-th audio source data 21-1 to 21-*n* stored in the memory 20 are data that serves as a base of first to n-th audio data DI1 to DIn. The decoder 30 outputs the demodulated i-th audio data DIi to an i-th output channel. The decoder 30 stops the output of the i-th audio data DIi to the i-th output channel in response to the control signal that instructs audio stop for the i-th audio source data 21-*i* output from the communication interface circuit 10. The decoder 30 may stop the output of the i-th audio data DIi to the i-th output channel when the demodulation is completed up to an end of the i-th audio source data 21-*i*.

The mixing circuit 40 outputs a mixing signal DO1 obtained by mixing two or more of first to n-th multiplication data obtained by respectively multiplying the first to n-th audio data DI1 to DIn by first to n-th gains G1 to Gn. The mixing circuit 40 includes the first to n-th input channels, and the first to n-th input channels are coupled to the first to n-th output channels of the decoder 30, respectively. An i-th gain Gi of the first to n-th gains Gi to Gn is set in the i-th input channel of the first to n-th input channels of the mixing circuit 40, and the i-th audio data DIi of the first to n-th audio data DI1 to DIn is input to the i-th input channel. The mixing circuit 40 includes first to m-th output channels, and outputs the mixing signal DO1 from a first output channel to the audio amplifier 70. Here, m is an integer of 2 or more.

The audio amplifier 70 converts the mixing signal DO1 output from the mixing circuit 40 into an audio signal DOX1 and outputs the audio signal DOX1 to a first audio player 3-1. Accordingly, audio corresponding to the audio signal DOX1 is output from the first audio player 3-1. For example, the first audio player 3-1 may be a speaker.

The mixing circuit 40 may output, as audio signals DO2 to DOm, predetermined m−1 pieces of multiplication data of the first to n-th multiplication data from second to m-th output channels to second to m-th audio players 3-2 to 3-*m*. Accordingly, audio corresponding to the audio signals DO2 to DOm is output from the second to m-th audio players 3-2 to 3-*m*. For example, each of the second to m-th audio players 3-2 to 3-*m* may be a buzzer.

The audio output from the first to m-th audio players 3-1 to 3-*m* may be, for example, a sound imitating a voice when a person speaks, or may be various kinds of sounds such as a mechanical warning sound, a sound effect, and the like.

The gain setting circuit 50 sets the first to n-th gains G1 to Gn in the first to n-th input channels of the mixing circuit 40, respectively, based on commands input from the outside of the audio mixing device 1. Specifically, when the gain setting circuit 50 receives a control signal that instructs audio play or audio stop for k-th audio source data 21-*k* output from the communication interface circuit 10, the gain setting circuit 50 refers to the channel-priority setting table 61, the priority-gain setting table 62, and the gain reference table 63, determines the priority between all audio data of the first to n-th audio data DI1 to DIn during play and k-th audio data DIk, and sets a gain of a value corresponding to the priority for each channel. For example, during play of j-th audio data DIj of the first to n-th audio data DI1 to DIn with a first value set to a j-th gain Gj of the first to n-th gains G1 to Gn, the gain setting circuit 50 sets the j-th gain Gj to a second value different from the first value when the gain setting circuit 50 receives a command to start or stop play of the k-th audio data DIk having a higher priority than j-th audio data DIj from the outside of the audio mixing device 1. Here, the second value may be smaller than the first value when receiving the command to start play of the k-th audio data DIk and the second value may be larger than the first value when receiving the command to stop play of the k-th audio data DIk.

When the k-th audio data of the first to n-th audio data DI1 to DIn is not to be played, the gain setting circuit 50 may set a k-th gain Gk to 0, or the decoder 30 may output 0 to a k-th output channel.

The channel-priority setting table 61 is a table that defines a correspondence relation between the first to n-th input channels of the mixing circuit 40 and the priorities thereof. The priority-gain setting table 62 is a table that defines a correspondence relation between the priorities that can be designated in the channel-priority setting table 61 and gain setting values. The gain reference table 63 is a table that defines a correspondence relation between the gain setting values that can be designated in the priority-gain setting table 62 and gain values. The channel-priority setting table 61 and the priority-gain setting table 62 are stored in a RAM or a register (not shown), and are rewritten by a command input from the outside of the audio mixing device 1. RAM is an abbreviation of random-access memory. The gain reference table 63 is stored in a ROM (not shown) and is not rewritten. ROM is an abbreviation of read-only memory.

Figure 2:
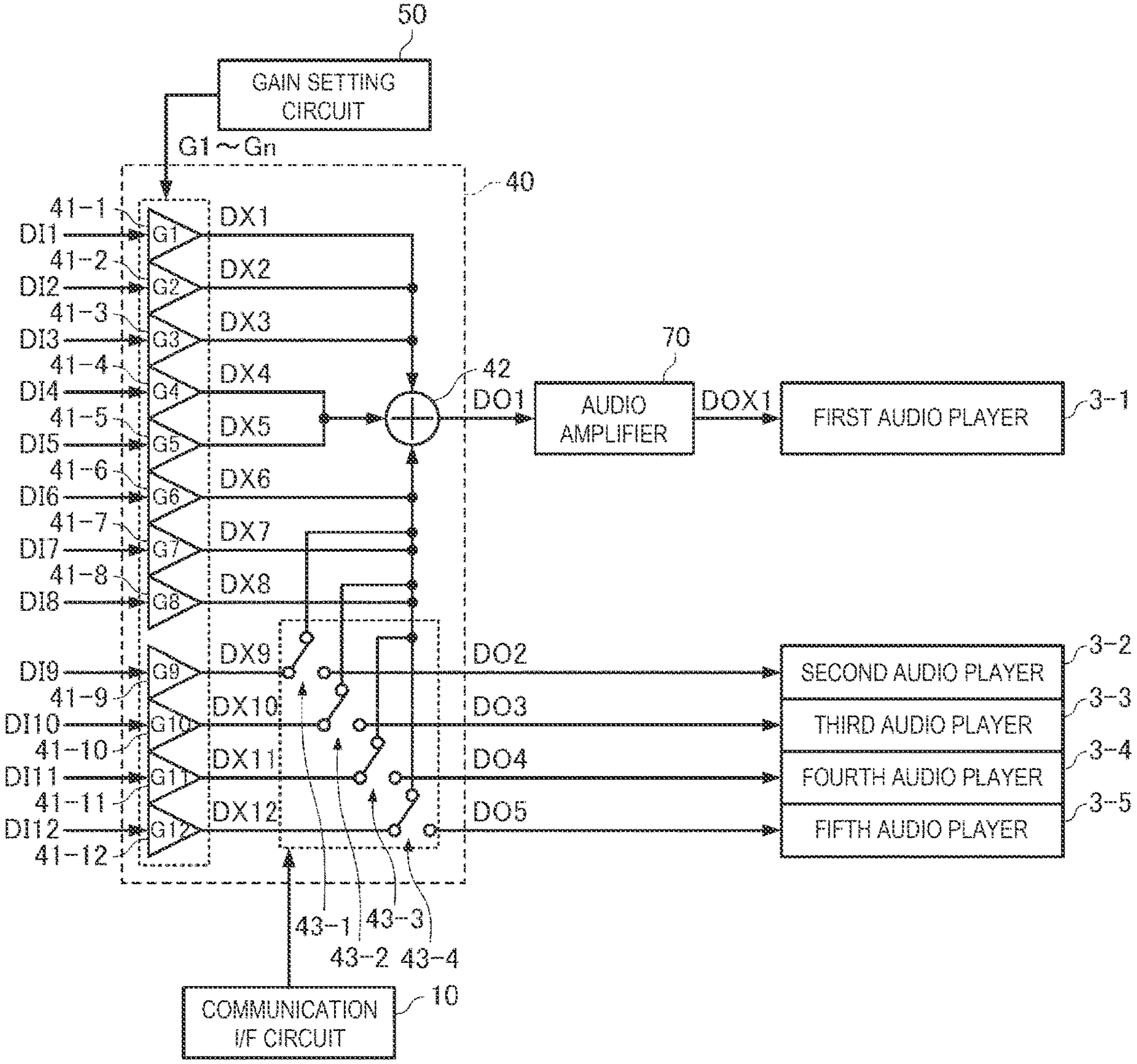
FIG. 2 is a diagram showing a specific configuration example of a mixing circuit.

FIG. 2 is a diagram showing a specific configuration example of the mixing circuit 40. In the example of FIG. 2, the mixing circuit 40 includes twelve input channels and five output channels. That is, FIG. 2 shows an example in which the integer n is 12 and the integer m is 5 in FIG. 1.

In the example of FIG. 2, the mixing circuit 40 includes twelve multipliers 41-1 to 41-12, an adder 42, and four switch circuits 43-1 to 43-4.

The i-th audio data DIi of the first to twelfth audio data DI1 to DI12 is input to the i-th input channel of first to twelfth input channels, and the i-th gain Gi of the first to twelfth gains G1 to G12 is set by the gain setting circuit 50. The i-th input channel is provided with a multiplier 41-*i* of the multipliers 41-1 to 41-12, and the multiplier 41-*i* outputs the i-th multiplication data DXi obtained by multiplying the i-th audio data DIi by the i-th gain Gi.

The switch circuit 43-1 switches between whether to output ninth multiplication data DX9 to the adder 42 or to output the ninth multiplication data DX9 as the audio signal DO2 from a second output channel to the second audio player 3-2. In the latter case, audio corresponding to the audio signal DO2 is output from the second audio player 3-2.

A switch circuit 43-2 switches between whether to output tenth multiplication data DX10 to the adder 42 or to output the tenth multiplication data DX10 as an audio signal DO3 from a third output channel to a third audio player 3-3. In the latter case, audio corresponding to the audio signal DO3 is output from the third audio player 3-3.

A switch circuit 43-3 switches between whether to output eleventh multiplication data DX11 to the adder 42 or to output the eleventh multiplication data DX11 as an audio signal DO4 from a fourth output channel to a fourth audio player 3-4. In the latter case, audio corresponding to the audio signal DO4 is output from the fourth audio player 3-4.

The switch circuit 43-4 switches between whether to output twelfth multiplication data DX12 to the adder 42 or to output the twelfth multiplication data DX12 as an audio signal DO5 from a fifth output channel to a fifth audio player 3-5. In the latter case, audio corresponding to the audio signal DO5 is output from the fifth audio player 3-5.

The switch circuits 43-1 to 43-4 are switched according to the control signals output from the communication interface circuit 10. That is, the microcontroller 2 can set output destinations of the ninth to twelfth multiplication data DX9 to DX12 by outputting predetermined commands to the audio mixing device 1, respectively.

First to eighth multiplication data DX1 to DX8 are input to the adder 42. Depending on the switching setting of the switch circuits 43-1 to 43-4, at least one of the ninth to twelfth multiplication data DX9 to DX12 may also be input to the adder 42.

When the adder 42 receives none of the ninth to twelfth multiplication data DX9 to DX12, the adder 42 outputs the mixing signal DO1 obtained by adding the first to eighth multiplication data DX1 to DX8. When the adder 42 receives at least one of the ninth to twelfth multiplication data DX9 to DX12 is input, the adder 42 outputs the mixing signal DO1 obtained by adding the first to eighth multiplication data DX1 to DX8 and the received at least one of ninth to twelfth multiplication data DX9 to DX12.

The mixing signal DO1 output from the adder 42 is output from the first output channel to the audio amplifier 70, and the audio amplifier 70 converts the mixing signal DO1 into an audio signal DOX1 and outputs the audio signal DOX1 to the first audio player 3-1. Accordingly, audio corresponding to the audio signal DOX1 is output from the first audio player 3-1.

FIG. 3 is a diagram showing an example of the channel-priority setting table 61, the priority-gain setting table 62, and the gain reference table 63 when the mixing circuit 40 is configured as shown in FIG. 2. In FIG. 3, Ch1 to Ch12 are the first to twelfth input channels of the mixing circuit 40, respectively.

In the example of FIG. 3, in the channel-priority setting table 61, a priority Pr7 is associated with the first input channel, a priority Pr5 is associated with a second input channel, a priority Pr9 is associated with a third input channel, a priority Pr12 is associated with a fourth input channel, a priority Pr6 is associated with a fifth input channel, and a priority Pr2 is associated with a sixth input channel. A priority Pr10 is associated with a seventh input channel, a priority Pr11 is associated with an eighth input channel, a priority Pr1 is associated with a ninth input channel, a priority Pr3 is associated with a tenth input channel, a priority Pr8 is associated with an eleventh input channel, and a priority Pr4 is associated with the twelfth input channel. Among the priorities Pr1 to Pr12, Pri represents i-th highest priority. That is, since the priority Pr1 is the highest and the priority Pr12 is the lowest, the priority is assigned to the ninth input channel, the sixth input channel, the tenth input channel, the twelfth input channel, the second input channel, the fifth input channel, the first input channel, the eleventh input channel, the third input channel, the seventh input channel, the eighth input channel, and the fourth input channel in descending order.

In the example of FIG. 3, in the priority-gain setting table 62, the priority Pr1 is associated with a gain setting value 0x00, the priority Pr2 is associated with a gain setting value 0x0C, the priority Pr3 is associated with a gain setting value 0x18, the priority Pr4 is associated with a gain setting value 0x24, the priority Pr5 is associated with a gain setting value 0x30, and the priority Pr6 is associated with a gain setting value 0x3C. The priority Pr7 is associated with a gain setting value 0x48, the priority Pr8 is associated with a gain setting value 0x54, the priority Pr9 is associated with a gain setting value 0x60, the priority Pr10 is associated with a gain setting value 0x6C, the priority Pr11 is associated with a gain setting value 0x78, and the priority Pr12 is associated with a gain setting value 0x84.

In the example of FIG. 3, in the gain reference table 63, a gain value of 0 dB is associated with the gain setting value 0x00, gain values of −0.25 dB to −63.5 dB are associated with the gain setting values 0x01 to 0xFE in increments of −0.25 dB, and "nosound" is associated with the gain setting value 0xFF. Here, "nosound" corresponds to a gain value of −∞ dB.

The priorities Pr1 to Pr12 of the channel-priority setting table 61 are respectively linked to the priorities Pr1 to Pr12 of the priority-gain setting table 62, and the gain setting values of the priority-gain setting table 62 are respectively linked to the gain setting values of the gain reference table 63. Therefore, a gain value of −18 dB corresponding to the gain setting value 0x48 is associated with the first input channel of the priority Pr7, a gain value of −12 dB corresponding to the gain setting value 0x30 is associated with the second input channel of the priority Pr5, a gain value of −24 dB corresponding to the gain setting value 0x60 is associated with the third input channel of the priority Pr9, and a gain value of −33 dB corresponding to the gain setting value 0x84 is associated with the fourth input channel of the priority Pr12. A gain value of −15 dB corresponding to the gain setting value 0x3C is associated with the fifth input channel of the priority Pr6, a gain value of −3 dB corresponding to the gain setting value 0x0C is associated with the sixth input channel of the priority Pr2, a gain value of −27 dB corresponding to the gain setting value 0x6C is associated with the seventh input channel of the priority Pr10, and a gain value of −30 dB corresponding to the gain setting value 0x78 is associated with the eighth input channel of the priority Pr11. A gain value of 0 dB corresponding to the gain setting value 0x00 is associated with the ninth input channel of the priority Pr1, a gain value of −6 dB corresponding to the gain setting value 0x18 is associated with the tenth input channel of the priority Pr3, a gain value of −21 dB corresponding to the gain setting value 0x54 is associated with the eleventh input channel of the priority Pr8, and a gain value of −9 dB corresponding to the gain setting value 0x24 is associated with the twelfth input channel of the priority Pr4. That is, by the channel-priority setting table 61, the priority-gain setting table 62, and the gain reference table 63, the gain values of −18 dB, −12 dB, −24 dB, −33 dB, −15 dB, −3 dB, −27 dB, −30 dB, 0 dB, −6 dB, −21 dB, and −9 dB are associated with the first to twelfth input channels in this order.

In a period in which the first to twelfth audio data DI1 to DI12 are simultaneously played by the first audio player 3-1, the gain setting circuit 50 sets the gain values of −18 dB, −12 dB, −24 dB, −33 dB, −15 dB, −3 dB, −27 dB, −30 dB, 0 dB, −6 dB, −21 dB, and −9 dB, which are associated with the first to twelfth gains G1 to G12 by the channel-priority setting table 61, the priority-gain setting table 62, and the gain reference table 63 as described above. Accordingly, audio obtained by synthesizing the first to twelfth audio data DI1 to DI12 at a higher volume as the audio data input to the input channel having a higher priority is played by the first audio player 3-1.

In a period in which only a part of the first to twelfth audio data DI1 to DI12 is simultaneously played by the first audio player 3-1, the gain setting circuit 50 newly sets a priority for an input channel corresponding to each audio data simultaneously played by the first audio player 3-1. Specifically, the gain setting circuit 50 refers to the channel-priority setting table 61, and resets the respective priorities Pr1, Pr2, and so on in descending order of the priorities to the input channels to which audio data simultaneously played by the first audio player 3-1 is input. The gain setting circuit 50 links the respective priorities Pr1, Pr2, and so on that have been reset to the input channels to the priorities Pr1, Pr2, and so on of the priority-gain setting table 62 instead of the channel-priority setting table 61, and sets the gain value associated with the gain corresponding to each input channel by the priority-gain setting table 62 and the gain reference table 63.

In a period in which the ninth to twelfth audio data DI9 to DI12 are respectively played by the second to fifth audio players 3-2 to 3-5, the gain setting circuit 50 may set the gain value of 0 dB corresponding to the gain setting value 0x00 associated with the highest priority Pr1 to each of the ninth to twelfth gains G9 to G12.

Figure 4:
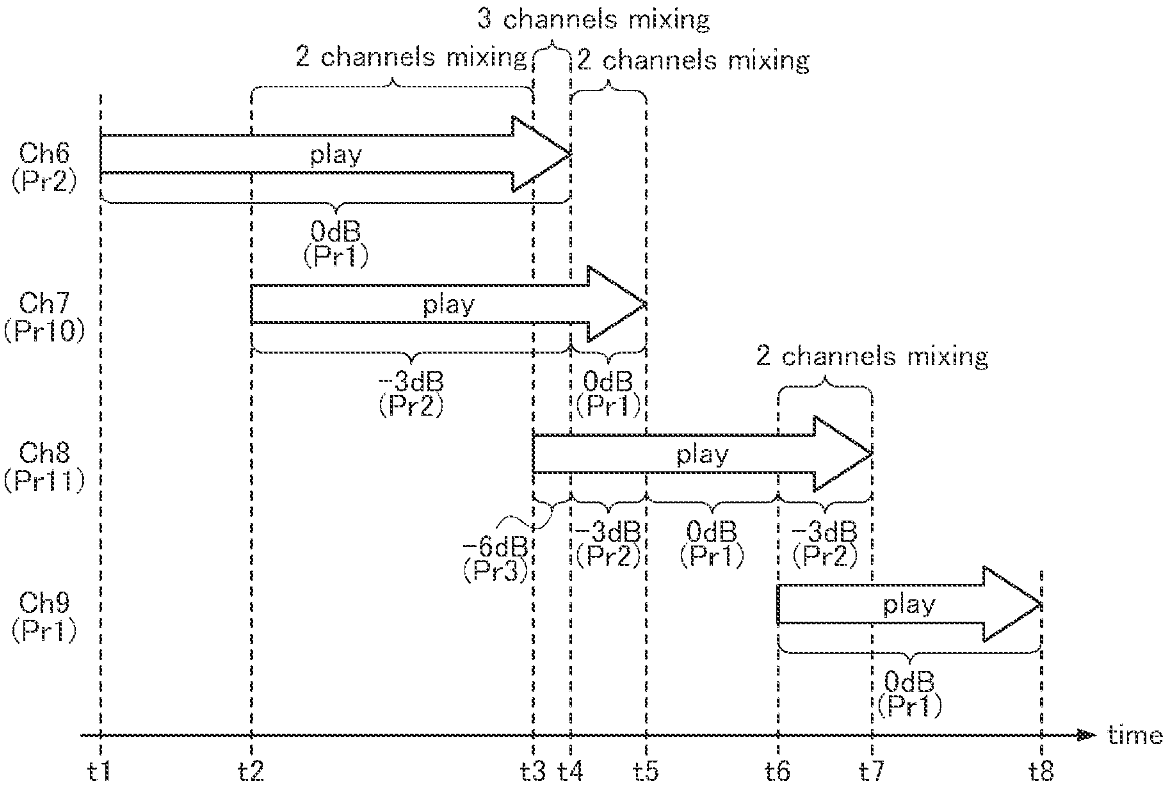
FIG. 4 shows a specific example in which a plurality of pieces of audio data are simultaneously played by a first audio player.

FIG. 4 shows a specific example in which a plurality of pieces of audio data are simultaneously played by the first audio player 3-1 when the channel-priority setting table 61, the priority-gain setting table 62, and the gain reference table 63 are configured as shown in FIG. 3. In FIG. 4, Ch6 to Ch9 are the sixth to ninth input channels of the mixing circuit 40, respectively.

In the example of FIG. 4, at a time t1, play of sixth audio data DI6 input to the sixth input channel starts. In a period from the time t1 to a time t2, since the audio data played by the first audio player 3-1 is only the sixth audio data DI6, the gain setting circuit 50 resets the highest priority Pr1 to the sixth input channel. The gain setting circuit 50 sets the gain value of 0 dB corresponding to the gain setting value 0x00 associated with the priority Pr1 to a sixth gain G6.

Next, at the time t2, play of seventh audio data DI7 input to the seventh input channel starts. Accordingly, in a period from the time t2 to a time t3, the sixth audio data DI6 and the seventh audio data DI7 are simultaneously played by the first audio player 3-1. Since the priority Pr2 associated with the sixth input channel is higher than the priority Pr10 associated with the seventh input channel, the gain setting circuit 50 resets the highest priority Pr1 to the sixth input channel and resets the second highest priority Pr2 to the seventh input channel. The gain setting circuit 50 sets the gain value of 0 dB corresponding to the gain setting value 0x00 associated with the priority Pr1 to the sixth gain G6, and sets the gain value of −3 dB corresponding to the gain setting value 0x0C associated with the priority Pr2 to a seventh gain G7.

Next, at the time t3, play of eighth audio data DI8 input to the eighth input channel starts. Accordingly, in a period from the time t3 to a time t4, the sixth audio data DI6, the seventh audio data DI7, and the eighth audio data DI8 are simultaneously played by the first audio player 3-1. Since the priority Pr2 associated with the sixth input channel is higher than the priority Pr10 associated with the seventh input channel and the priority Pr11 associated with the eighth input channel, and the priority Pr10 associated with the seventh input channel is higher than the priority Pr11 associated with the eighth input channel, the gain setting circuit 50 resets the highest priority Pr1 for the sixth input channel, resets the second highest priority Pr2 for the seventh input channel, and resets the third highest priority Pr3 for the eighth input channel. The gain setting circuit 50 sets the gain value of 0 dB corresponding to the gain setting value 0x00 associated with the priority Pr1 to the sixth gain G6, sets the gain value of −3 dB corresponding to the gain setting value 0x0C associated with the priority Pr2 to the seventh gain G7, and sets the gain value of −6 dB corresponding to the gain setting value 0x18 associated with the priority Pr3 to an eighth gain G8.

Next, at the time t4, the play of the sixth audio data DI6 is stopped. Accordingly, in a period from the time t4 to a time t5, the seventh audio data DI7 and the eighth audio data DI8 are simultaneously played by the first audio player 3-1. Since the priority Pr10 associated with the seventh input channel is higher than the priority Pr11 associated with the eighth input channel, the gain setting circuit 50 resets the highest priority Pr1 to the seventh input channel and resets the second highest priority Pr2 to the eighth input channel. The gain setting circuit 50 sets the gain value of 0 dB corresponding to the gain setting value 0x00 associated with the priority Pr1 to the seventh gain G7, and sets the gain value of −3 dB corresponding to the gain setting value 0x0C associated with the priority Pr2 to the eighth gain G8.

Thus, the gain setting circuit 50 sets the gain values of 0 dB, −3 dB, and −6 dB to the sixth to eighth gains G6 to G8, respectively. When the play of the sixth audio data DI6 having a higher priority than the seventh and eighth audio data DI7 and DI8 is stopped at the time t4 during play of the sixth to eighth audio data DI6 to DI8, the gain setting circuit 50 sets the seventh and eighth gains G7 and G8 to higher gain values of 0 dB and −3 dB, which are different from the gain values of −3 dB and −6 dB, respectively. The gain values of −3 dB and −6 dB respectively set to the seventh and eighth gains G7 and G8 before the play of the sixth audio data DI6 is stopped are an example of the “first value”, and the gain values of 0 dB and −3 dB respectively set to the seventh and eighth gains G7 and G8 after the play of the sixth audio data DI6 is stopped are an example of the “second value”.

Next, at the time t5, the play of the seventh audio data DI7 is stopped. Accordingly, in a period from the time t5 to a time t6, since the audio data played by the first audio player 3-1 is only the eighth audio data DI8, the gain setting circuit 50 resets the highest priority Pr1 to the eighth input channel. The gain setting circuit 50 sets the gain value of 0 dB corresponding to the gain setting value 0x00 associated with the priority Pr1 to the eighth gain G8.

Thus, the gain setting circuit 50 sets the gain values of 0 dB and −3 dB to the seventh and eighth gains G7 and G8, respectively, and when the play of the seventh audio data DI7 having a higher priority than the eighth audio data DI8 is stopped at the time t5 during the play of the seventh and eighth audio data DI7 and DI8, the gain setting circuit 50 sets the eighth gain G8 to the higher gain value of 0 dB which is different from the gain value of −3 dB. The gain value of −3 dB set to the eighth gain G8 before the play of the seventh audio data DI7 is stopped is an example of the “first value”, and the gain value of 0 dB set to the eighth gain G8 after the play of the seventh audio data DI7 is stopped is an example of the "second value".

Next, at the time t6, play of ninth audio data DI9 input to the ninth input channel starts. Accordingly, in a period from the time t6 to a time t7, the eighth audio data DI8 and the ninth audio data DI9 are simultaneously played by the first audio player 3-1. Since the priority Pr1 associated with the ninth input channel is higher than the priority Pr11 associated with the eighth input channel, the gain setting circuit 50 resets the highest priority Pr1 to the ninth input channel and resets the second highest priority Pr2 to the eighth input channel. The gain setting circuit 50 sets the gain value of 0 dB corresponding to the gain setting value 0x00 associated with the priority Pr1 to the ninth gain G9, and sets the gain value of −3 dB corresponding to the gain setting value 0x0C associated with the priority Pr2 to the eighth gain G8.

Thus, the gain setting circuit 50 sets the gain value of 0 dB to the eighth gain G8, and when the play of the ninth audio data DI9 having a higher priority than the eighth audio data DI8 is started at the time t6 during the play of the eighth audio data DI8, the gain setting circuit 50 sets the eighth gain G8 to the lower gain value of −3 dB which is different from the gain value of 0 dB. The gain value of 0 dB set to the eighth gain G8 before the play of the ninth audio data DI9 is started is an example of the "first value", and the gain value of −3 dB set to the eighth gain G8 after the play of the ninth audio data DI9 is started is an example of the "second value".

Next, at the time t7, the play of the eighth audio data DI8 is stopped. Accordingly, in a period from the time t7 to a time t8 at which the play of the ninth audio data DI9 is stopped, since the audio data played by the first audio player 3-1 is only the ninth audio data DI9, the gain setting circuit 50 resets the highest priority Pr1 to the ninth input channel. The gain setting circuit 50 sets the gain value of 0 dB corresponding to the gain setting value 0x00 associated with the priority Pr1 to the ninth gain G9.

In the audio mixing device 1 according to the first embodiment described above, the gain setting circuit 50 sets the first to n-th gains G1 to Gn based on a command input from an external microcontroller 2, the mixing circuit 40 outputs the mixing signal DO1 obtained by mixing two or more of the first to n-th multiplication data obtained by respectively multiplying the first to n-th audio data DI1 to DIn by the first to n-th gains G1 to Gn, and the audio amplifier 70 converts the mixing signal DO1 into the audio signal DO1X and outputs the audio signal DO1X to the first audio player 3-1. Therefore, according to the audio mixing device 1 of the first embodiment, the first audio player 1 can play a plurality of pieces of audio data of the first to n-th audio data DI1 to DIn which is requested to be played, without delay.

According to the audio mixing device 1 of the first embodiment, since the gain setting circuit 50 sets not the same gain but the first to n-th gains of the first to n-th gains G1 to Gn for the plurality of pieces of audio data to be played, a user can easily distinguish the plurality of pieces of audio data to be simultaneously played. In particular, for the plurality of pieces of audio data to be simultaneously played, the gain setting circuit 50 sets a higher gain for audio data having a higher priority, so that the user can easily hear the audio data having higher priority.

In the audio mixing device 1 according to the first embodiment, during the play of the j-th audio data DIj with the first value set to the j-th gain Gj, the gain setting circuit 50 sets the j-th gain Gj to the second value different from the first value when the play of the k-th audio data DIk having a higher priority than the j-th audio data DIj is started or stopped. Therefore, according to the audio mixing device 1 of the first embodiment, when the priority of the j-th audio data DIj during play increases or decreases, a play volume of the j-th audio data can be appropriately changed.

The audio mixing device 1 according to the first embodiment includes the memory 20 that stores the first to n-th audio source data 21-1 to 21-*n* that serves as the base of the first to n-th audio data DI1 to DIn. Therefore, according to the audio mixing device 1 of the first embodiment, since it is not necessary to acquire the first to n-th audio source data 21-1 to 21-*n* from the outside, it is possible to advance the timing at which the play of the first to n-th audio data DI1 to DIn is started.

1-2. Second Embodiment

Hereinafter, in the audio mixing device 1 according to a second embodiment, the same components as those in the first embodiment will be denoted by the same reference numerals, the description similar to that in the first embodiment will be omitted or simplified, and the content different from that in the first embodiment will be mainly described.

Figure 5:
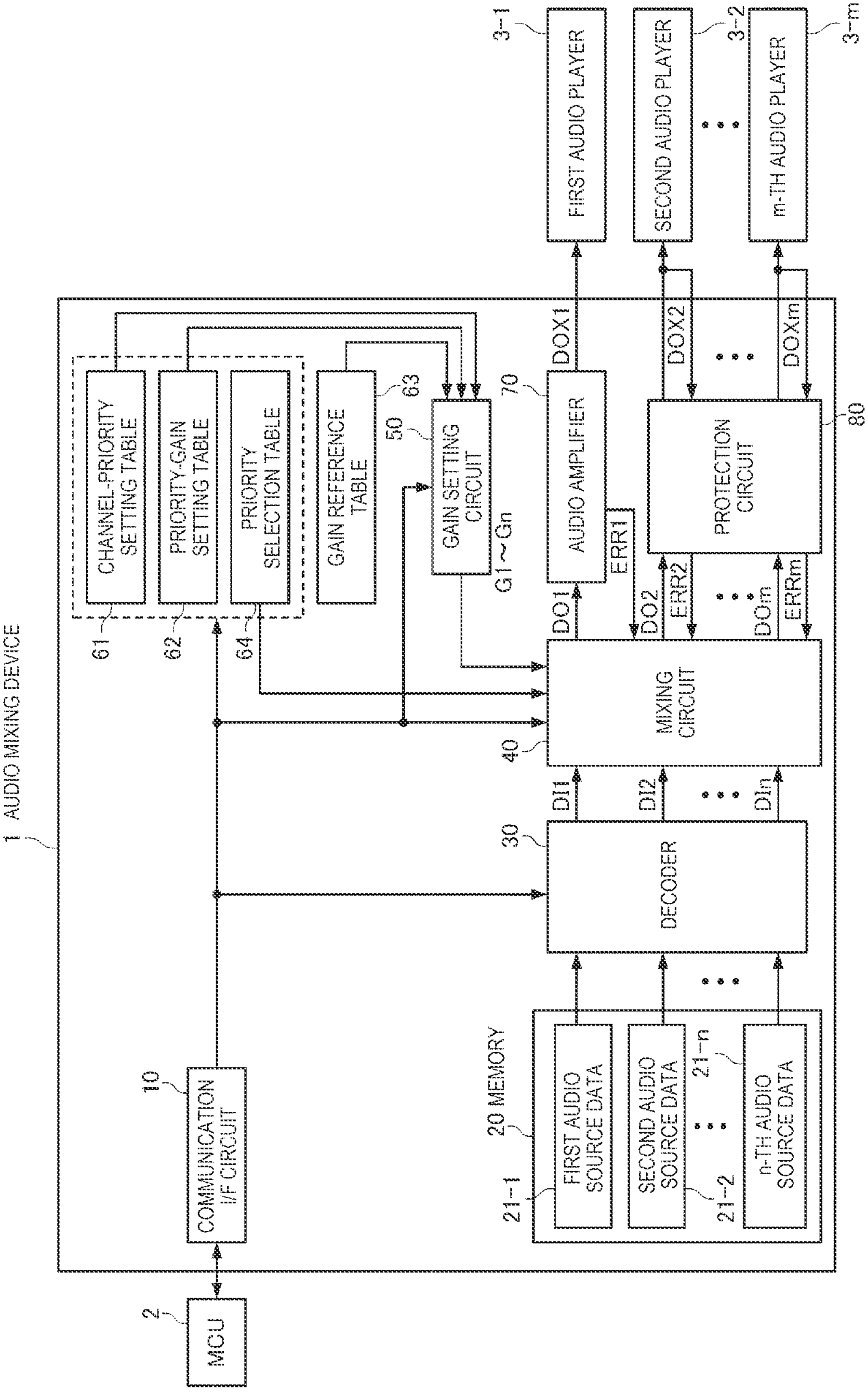
FIG. 5 is a diagram showing a configuration example of an audio mixing device according to a second embodiment.

FIG. 5 is a diagram showing a configuration example of the audio mixing device 1 according to the second embodiment. As shown in FIG. 5, the audio mixing device 1 according to the second embodiment includes the communication interface circuit 10, the memory 20, the decoder 30, the mixing circuit 40, the gain setting circuit 50, the channel-priority setting table 61, the priority-gain setting table 62, the gain reference table 63, and the audio amplifier 70 as in the first embodiment, and further includes a priority selection table 64 and a protection circuit 80. The audio mixing device 1 according to the second embodiment may be a single-chip semiconductor integrated circuit device, or a multi-chip semiconductor integrated circuit device, or at least a part thereof may be configured with an electronic component other than the semiconductor integrated circuit device.

Since the functions and configurations of the memory 20, the decoder 30, the gain setting circuit 50, the channel-priority setting table 61, the priority-gain setting table 62, and the gain reference table 63 are the same as those of the first embodiment, the description thereof will be omitted.

As in the first embodiment, the communication interface circuit 10 receives, from the microcontroller 2, an audio play command or an audio stop command for the i-th audio source data 21-*i* and a data write command for the channel-priority setting table 61 or the priority-gain setting table 62, and generates control signals corresponding to the received commands. Further, in the second embodiment, when the communication interface circuit 10 receives a data write command for the priority selection table 64, the communication interface circuit 10 generates a control signal for writing data designated by an address designated by the command.

As in the first embodiment, the audio amplifier 70 converts the mixing signal DO1 output from the mixing circuit 40 into the audio signal DOX1 and outputs the audio signal DOX1 to the first audio player 3-1. Further, in the second embodiment, the audio amplifier 70 determines whether the audio signal DOX1 is normal or abnormal, and outputs an abnormality detection signal ERR1 to the mixing circuit 40 when it is determined that the audio signal DOX1 is abnormal.

As in the first embodiment, the mixing circuit 40 may output the mixing signal DO1 and further output the audio signals DO2 to DOm to the second to m-th audio players 3-2 to 3-*m*. Further, in the second embodiment, when the mixing circuit 40 receives the abnormality detection signal ERR1 output from the audio amplifier 70, the mixing circuit 40 outputs the mixing signal DO1 to any one of the second to m-th audio players 3-2 to 3-*m*. In particular, the integer m is set to an integer of 3 or more. When the abnormality detection signal ERR1 is input, the mixing circuit 40 selects one of the second to m-th audio players 3-2 to 3-*m* based on the priority selection table 64, and outputs the mixing signal DO1 to the selected one of the second to m-th audio players 3-2 to 3-*m*.

The priority selection table 64 is a table in which priorities are set to select from the second to m-th output channels as an output destination of the mixing signal DO1 when the mixing circuit 40 receives the abnormality detection signal ERR1. The priority selection table 64 is stored in a RAM or a register (not shown), and is rewritten by a command input from the outside of the audio mixing device 1.

For example, when the mixing circuit 40 receives the abnormality detection signal ERR1, the mixing circuit 40 may select an i-th audio player 3-*i* of the second to m-th audio players 3-2 to 3-*m* with the highest priority designated in the priority selection table 64, and output the mixing signal DO1 to the selected i-th audio player 3-*i*.

The protection circuit 80 outputs the audio signals DO2 to DOm to the second to m-th audio players 3-2 to 3-*m* as the audio signals DOX2 to DOXm, respectively, and determines whether each of the audio signals DOX2 to DOXm is normal or abnormal. The protection circuit 80 outputs abnormality detection signals ERR2 to ERRm to the mixing circuit 40 when it is determined that any one of the audio signals DOX2 to DOXm is abnormal.

For example, when the mixing circuit 40 receives the abnormality detection signal ERR1, in a case where an abnormality detection signal ERRj of the abnormality detection signals ERR2 to ERRm is input, the mixing circuit 40 may output the mixing signal DO1 to a k-th audio player 3-*k* of the second to m-th audio players 3-2 to 3-*m* with the highest priority designated except a j-th audio player 3-*j* in the priority selection table 64.

The audio mixing device 1 may not include the protection circuit 80.

Figure 6:
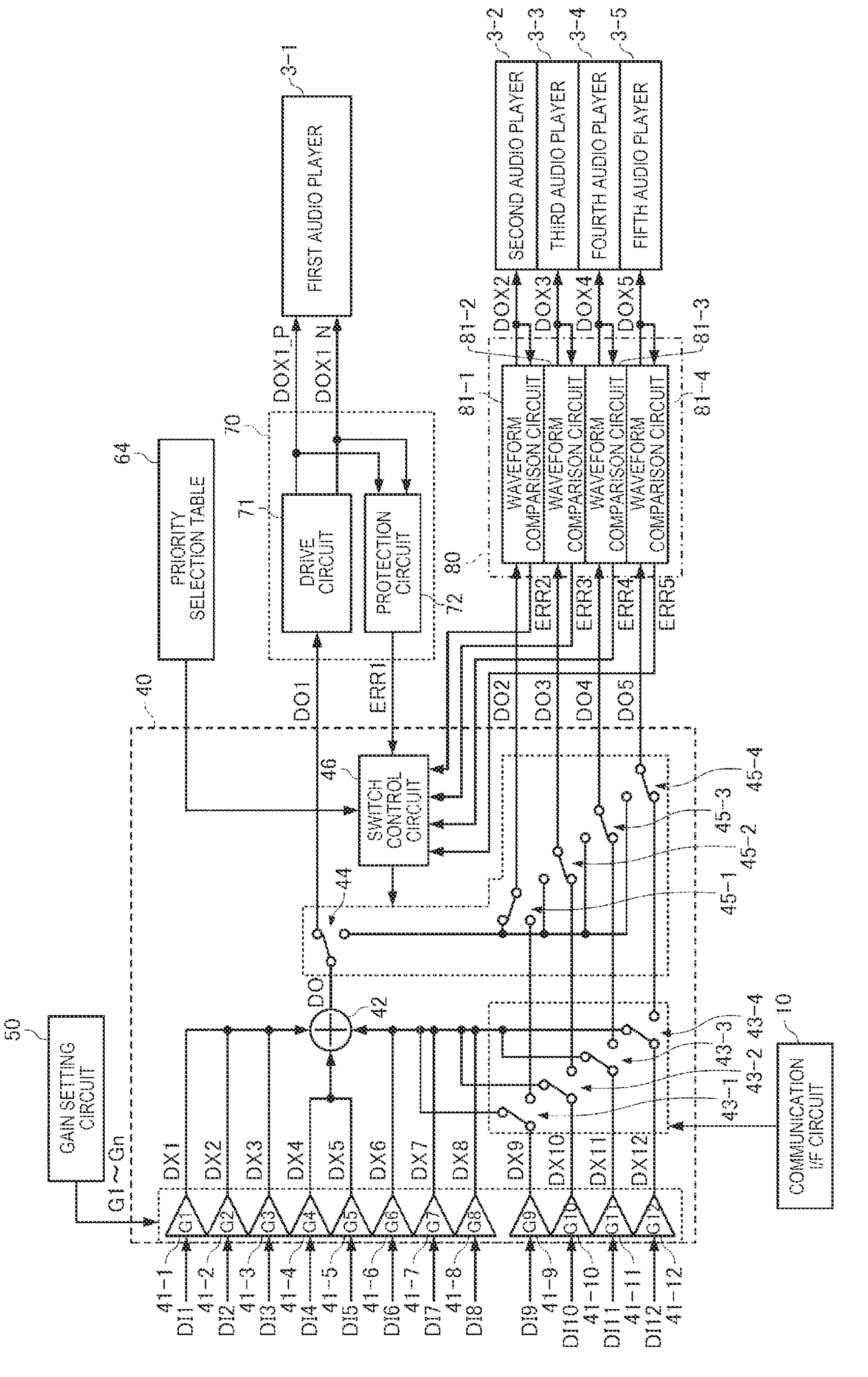
FIG. 6 is a diagram showing a specific configuration example of a mixing circuit, an audio amplifier, and a protection circuit according to the second embodiment.

FIG. 6 is a diagram showing a specific configuration example of the mixing circuit 40, the audio amplifier 70, and the protection circuit 80 according to the second embodiment. In the example of FIG. 6, the mixing circuit 40 includes twelve input channels and five output channels. That is, FIG. 6 shows an example in which the integer n is 12 and the integer m is 5 in FIG. 5.

In the example of FIG. 6, the audio amplifier 70 includes a drive circuit 71 and a protection circuit 72. The drive circuit 71 converts the mixing signal DO1 into the audio signal DOX1 and outputs the audio signal DOX1 to the first audio player 3-1. In the example of FIG. 6, the audio signal DOX1 is differential audio signals DOX1_P and DOX1_N. Accordingly, audio corresponding to the audio signals DOX1_P and DOX1_N is output from the first audio player 3-1.

The protection circuit 72 determines whether the audio signals DOX1_P and DOX1_N are normal or abnormal, and outputs the abnormality detection signal ERR1 to a switch control circuit 46 of the mixing circuit 40 when it is determined that the audio signals DOX1_P and DOX1_N are abnormal. For example, the protection circuit 72 may measure a current flowing through signal lines through which the audio signals DOX1_P and DOX1_N are output or through a signal line inside the drive circuit 71, detect an overcurrent when the measured value is higher than a predetermined value, and output the abnormality detection signal ERR1. The protection circuit 72 may output the abnormality detection signal ERR1 when logical levels of the audio signals DOX1_P and DOX1_N are high for a predetermined time or longer.

The protection circuit 80 includes four waveform comparison circuits 81-1 to 81-4.

The waveform comparison circuit 81-1 outputs the audio signal DO2 as the audio signal DOX2 to the second audio player 3-2. The waveform comparison circuit 81-1 compares a waveform of the audio signal DOX2 with a waveform of the audio signal DO2, determines whether the audio signal DOX2 is normal or abnormal based on a difference between the waveforms, and outputs the abnormality detection signal ERR2 to the switch control circuit 46 of the mixing circuit 40 when it is determined that the audio signal DOX2 is abnormal.

A waveform comparison circuit 81-2 outputs the audio signal DO3 as the audio signal DOX3 to the third audio player 3-3. The waveform comparison circuit 81-2 compares a waveform of the audio signal DOX3 with a waveform of the audio signal DO3, determines whether the audio signal DOX3 is normal or abnormal based on a difference between the waveforms, and outputs an abnormality detection signal ERR3 to the switch control circuit 46 of the mixing circuit 40 when it is determined that the audio signal DOX3 is abnormal.

A waveform comparison circuit 81-3 outputs the audio signal DO4 as an audio signal DOX4 to the fourth audio player 3-4. The waveform comparison circuit 81-3 compares a waveform of the audio signal DOX4 with a waveform of the audio signal DO4, determines whether the audio signal DOX4 is normal or abnormal based on a difference between the waveforms, and outputs an abnormality detection signal ERR4 to the switch control circuit 46 of the mixing circuit 40 when it is determined that the audio signal DOX4 is abnormal.

The waveform comparison circuit 81-4 outputs the audio signal DO5 as an audio signal DOX5 to the fifth audio player 3-5. The waveform comparison circuit 81-4 compares a waveform of the audio signal DOX5 with a waveform of the audio signal DO5, determines whether the audio signal DOX5 is normal or abnormal based on a difference between the waveforms, and outputs an abnormality detection signal ERR5 to the switch control circuit 46 of the mixing circuit 40 when it is determined that the audio signal DOX5 is abnormal.

As in FIG. 2, the mixing circuit 40 includes the twelve multipliers 41-1 to 41-12, the adder 42, and the four switch circuits 43-1 to 43-4. Further, in the example of FIG. 6, the mixing circuit 40 includes the switch circuit 44, four switch circuits 45-1 to 45-4, and the switch control circuit 46.

Since the multipliers 41-1 to 41-12 are the same as those in FIG. 2, the description thereof will be omitted.

The switch circuit 43-1 switches between whether to output the ninth multiplication data DX9 to the adder 42 or to the switch circuit 45-1.

The switch circuit 43-2 switches between whether to output the tenth multiplication data DX10 to the adder 42 or to a switch circuit 45-2.

The switch circuit 43-3 switches between whether to output the eleventh multiplication data DX11 to the adder 42 or to a switch circuit 45-3.

The switch circuit 43-4 switches between whether to output the twelfth multiplication data DX12 to the adder 42 or to the switch circuit 45-4.

The first to eighth multiplication data DX1 to DX8 are input to the adder 42. By the switching setting of the switch circuits 43-1 to 43-4, at least one of the ninth to twelfth multiplication data DX9 to DX12 may also be input to the adder 42.

When the adder 42 receives none of the ninth to twelfth multiplication data DX9 to DX12, the adder 42 outputs a mixing signal DO obtained by adding the first to eighth multiplication data DX1 to DX8. When the adder 42 receives at least one of the ninth to twelfth multiplication data DX9 to DX12, the adder 42 outputs the mixing signal DO obtained by adding the first to eighth multiplication data DX1 to DX8 and the received at least one of the ninth to twelfth multiplication data DX9 to DX12.

The switch circuit 44 switches between whether to output the mixing signal DO output from the adder 42 to the drive circuit 71 of the audio amplifier 70 from the first output channel or to the switch circuits 45-1 to 45-4 as the mixing signal DO1.

The switch circuit 45-1 selects one of the ninth multiplication data DX9 and the mixing signal DO, and outputs the selected signal as the audio signal DO2 from the second output channel to the second audio player 3-2.

The switch circuit 45-2 selects one of the tenth multiplication data DX10 and the mixing signal DO, and outputs the selected signal as the audio signal DO3 from the third output channel to the third audio player 3-3.

The switch circuit 45-3 selects one of the eleventh multiplication data DX11 and the mixing signal DO, and outputs the selected signal as the audio signal DO4 from the fourth output channel to the fourth audio player 3-4.

The switch circuit 45-4 selects one of the twelfth multiplication data DX12 and the mixing signal DO, and outputs the selected signal as the audio signal DO5 from the fifth output channel to the fifth audio player 3-5.

The switch control circuit 46 controls the switch circuit 44 and the switch circuits 45-1 to 45-4 based on the abnormality detection signals ERR1 to ERR5. Specifically, when the switch control circuit 46 does not receive the abnormality detection signal ERR1, that is, when the audio signal DOX1 output to the first audio player 3-1 is normal, the switch control circuit 46 controls the switch circuit 44 such that the mixing signal DO is output from the first output channel as the mixing signal DO1, and controls the switch circuits 45-1 to 45-4 such that the ninth to twelfth multiplication data DX9 to DX12 are output from the second to fifth output channels as the audio signals DO2 to DO5, respectively.

When the switch control circuit 46 receives the abnormality detection signal ERR1, that is, when the audio signal DOX1 output to the first audio player 3-1 is abnormal, the switch control circuit 46 controls the switch circuit 44 such that the mixing signal DO is output to the switch circuits 45-1 to 45-4, and controls the switch circuits 45-1 to 45-4 such that the mixing signal DO is output from any one of the second to fifth output channels based on the abnormality detection signals ERR2 to ERR5 and the priority selection table 64. Specifically, when the switch control circuit 46 receives the abnormality detection signal ERR1, the switch control circuit 46 refers to the priority selection table 64, specifies the i-th output channel of one or more output channels which has the highest priority without the corresponding abnormality detection signal being not received, and controls the switch circuits 44, 45-1 to 45-4 such that the mixing signal DO is output from the i-th output channel.

FIG. 7 is a diagram showing an example of the priority selection table 64 when the mixing circuit 40 is configured as shown in FIG. 6. In FIG. 7, Ch2 to Ch5 are the second to fifth output channels of the mixing circuit 40, respectively. In the example of FIG. 7, in the priority selection table 64, the highest priority Pr1 is associated with the second output channel, the second highest priority Pr2 is associated with the third output channel, the third highest priority Pr3 is associated with the fourth output channel, and the lowest priority Pr4 is associated with the fifth input channel.

In the example of FIG. 7, in a case where the abnormality detection signal ERR1 is input when the audio corresponding to the mixing signal DO is played by the first audio player 3-1, if the abnormality detection signal ERR2 is not input, that is, if the audio signal DOX1 is abnormal and the audio signal DOX2 is normal, the switch control circuit 46 switches the switch circuits 44 and 45-1 such that the mixing signal DO is output from the second output channel. Accordingly, the audio play by the first audio player 3-1 is stopped, and the audio corresponding to the mixing signal DO is played by the second audio player 3-2.

In a case where the abnormality detection signal ERR1 is input when the audio corresponding to the mixing signal DO is played by the first audio player 3-1, if the abnormality detection signal ERR2 is input and the abnormality detection signal ERR3 is not input, that is, when the audio signals DOX1 and DOX2 are abnormal and the audio signal DOX3 is normal, the switch control circuit 46 switches the switch circuits 44 and 45-2 such that the mixing signal DO is output from the third output channel. Accordingly, the audio play by the first audio player 3-1 is stopped, and the audio corresponding to the mixing signal DO is played by the third audio player 3-3.

In a case where the abnormality detection signal ERR1 is input when the audio corresponding to the mixing signal DO is played by the first audio player 3-1, if the abnormality detection signal ERR2 and ERR3 are input and the abnormality detection signal ERR4 is not input, that is, when the audio signals DOX1, DOX2, and DOX3 are abnormal and the audio signal DOX4 is normal, the switch control circuit 46 switches the switch circuits 44 and 45-3 such that the mixing signal DO is output from the fourth output channel. Accordingly, the audio play by the first audio player 3-1 is stopped, and the audio corresponding to the mixing signal DO is played by the fourth audio player 3-4.

In a case where the abnormality detection signal ERR1 is input when the audio corresponding to the mixing signal DO is played by the first audio player 3-1, if the abnormality detection signal ERR2, ERR3, and ERR4 are input and the abnormality detection signal ERR5 is not input, that is, when the audio signals DOX1, DOX2, DOX3, and DOX4 are abnormal and the audio signal DOX5 is normal, the switch control circuit 46 switches the switch circuits 44 and 45-4 such that the mixing signal DO is output from the fifth output channel. Accordingly, the audio play by the first audio player 3-1 is stopped, and the audio corresponding to the mixing signal DO is played by the fifth audio player 3-5.

According to the audio mixing device 1 of the second embodiment described above, the same effects as those of the audio mixing device 1 according to the first embodiment are achieved. Further, in the audio mixing device 1 according to the second embodiment, when it is determined that the audio signal DOX1 is abnormal, the audio amplifier 70 outputs the abnormality detection signal ERR1 to the mixing circuit 40, and when the abnormality detection signal ERR1 is input, the mixing circuit 40 outputs the mixing signal DO to any one of the second to m-th audio players 3-2 to 3-*m*.

Specifically, when the abnormality detection signal ERR1 is input, the mixing circuit 40 selects one of the second to m-th audio players 3-2 to 3-*m* which has the highest priority and can be played based on the priority selection table 64 and the abnormality detection signals ERR2 to ERR5, and outputs the mixing signal DO. Therefore, according to the audio mixing device 1 of the second embodiment, even when an abnormality occurs in the first audio player 3-1 or the audio amplifier 70, one of the second to m-th audio players 3-2 to 3-*m* can play a plurality of pieces of audio data without delay.

1-3. Third Embodiment

Hereinafter, in the audio mixing device 1 according to a third embodiment, the same components as those in the first embodiment or the second embodiment will be denoted by the same reference numerals, the description similar to that in the first embodiment or the second embodiment will be omitted or simplified, and the content different from that in the first embodiment or the second embodiment will be mainly described.

Figure 8:
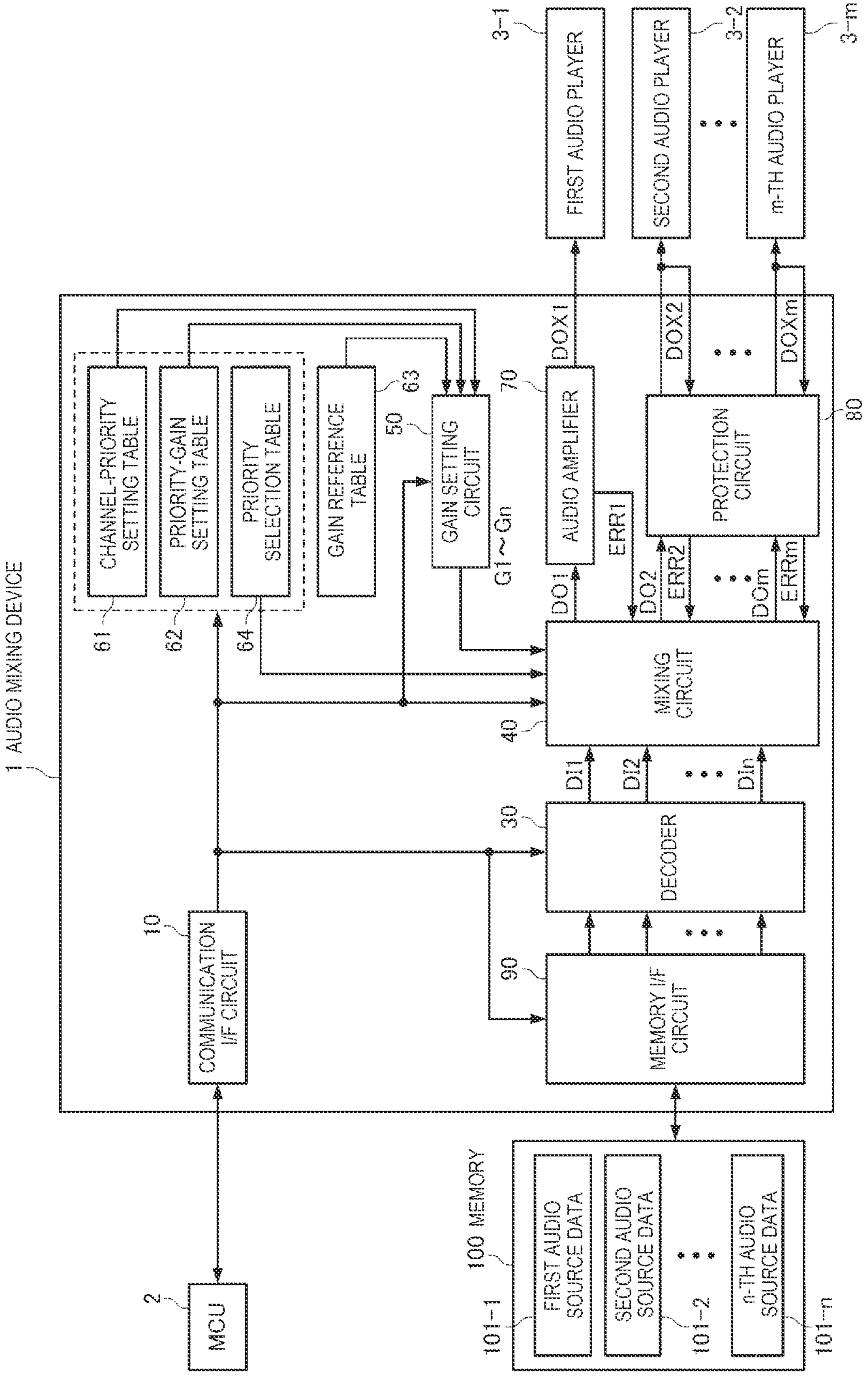
FIG. 8 is a diagram showing a configuration example of an audio mixing device according to a third embodiment.

FIG. 8 is a diagram showing a configuration example of the audio mixing device 1 according to the third embodiment. As shown in FIG. 8, the audio mixing device 1 according to the third embodiment includes a memory interface circuit 90 instead of the memory 20 with respect to audio mixing device 1 according to the second embodiment shown in FIG. 5.

The memory interface circuit 90 receives first to n-th audio source data 101-1 to 101-*n* from an external memory 100 of the audio mixing device 1. The memory interface circuit 90 may be, for example, a QSPI interface circuit. QSPI is an abbreviation of quad serial peripheral interface.

In response to a control signal that instructs audio play for i-th audio source data 101-*i* output from the communication interface circuit 10, the memory interface circuit 90 reads the i-th audio source data 101-*i* from the memory 100, and outputs the read i-th audio source data 101-*i* to the i-th input channel of the decoder 30.

The memory 100 stores n pieces of audio source data including the first to n-th audio source data 101-1 to 101-*n*. That is, the first to n-th audio source data 101-1 to 101-*n* are stored in the memory 100. The memory 100 may be, for example, a flash memory. The first to n-th audio source data 101-1 to 101-*n* may be, for example, pulse code modulated (PCM) audio data, or may be adaptive difference pulse code modulated (ADPCM) audio data. The audio data may be, for example, data of various kinds of sounds such as a sound imitating a voice when a person speaks, a mechanical warning sound, and a sound effect.

The decoder 30 decodes the i-th audio source data 101-*i* of the i-th input channel in response to the control signal that instructs the audio play for the i-th audio source data 101-*i* output from the communication interface circuit 10, and demodulates the i-th audio data DIi. As described above, the first to n-th audio source data 101-1 to 101-*n* stored in the memory 100 are data that serves as a base of the first to n-th audio data DI1 to DIn.

Other configurations and functions of the audio mixing device 1 according to the third embodiment are the same as those of the audio mixing device 1 according to the second embodiment, and the description thereof will be omitted.

The audio mixing device 1 according to the third embodiment may include the memory interface circuit 90 instead of the memory 20 with respect to the audio mixing device 1 according to the first embodiment shown in FIG. 1.

According to the audio mixing device 1 of the third embodiment described above, the same effects as those of the audio mixing device 1 according to the first embodiment or the second embodiment are achieved. Further, the audio mixing device 1 according to the third embodiment includes the memory interface circuit 90 that receives the first to n-th audio source data 101-1 to 101-*n* from the external memory 100. Therefore, according to the audio mixing device 1 of the third embodiment, since the first to n-th audio source data 101-1 to 101-*n* can be received from the external memory 100 via the memory interface circuit 90, it is not necessary to incorporate a memory for storing the first to n-th audio source data 101-1 to 101-*n*, and a circuit size can be reduced.

1-4. Fourth Embodiment

Hereinafter, in the audio mixing device 1 according to a fourth embodiment, the same components as those in the first embodiment or the second embodiment will be denoted by the same reference numerals, the description similar to that in the first embodiment or the second embodiment will be omitted or simplified, and the content different from that in the first embodiment or the second embodiment will be mainly described.

Figure 9:
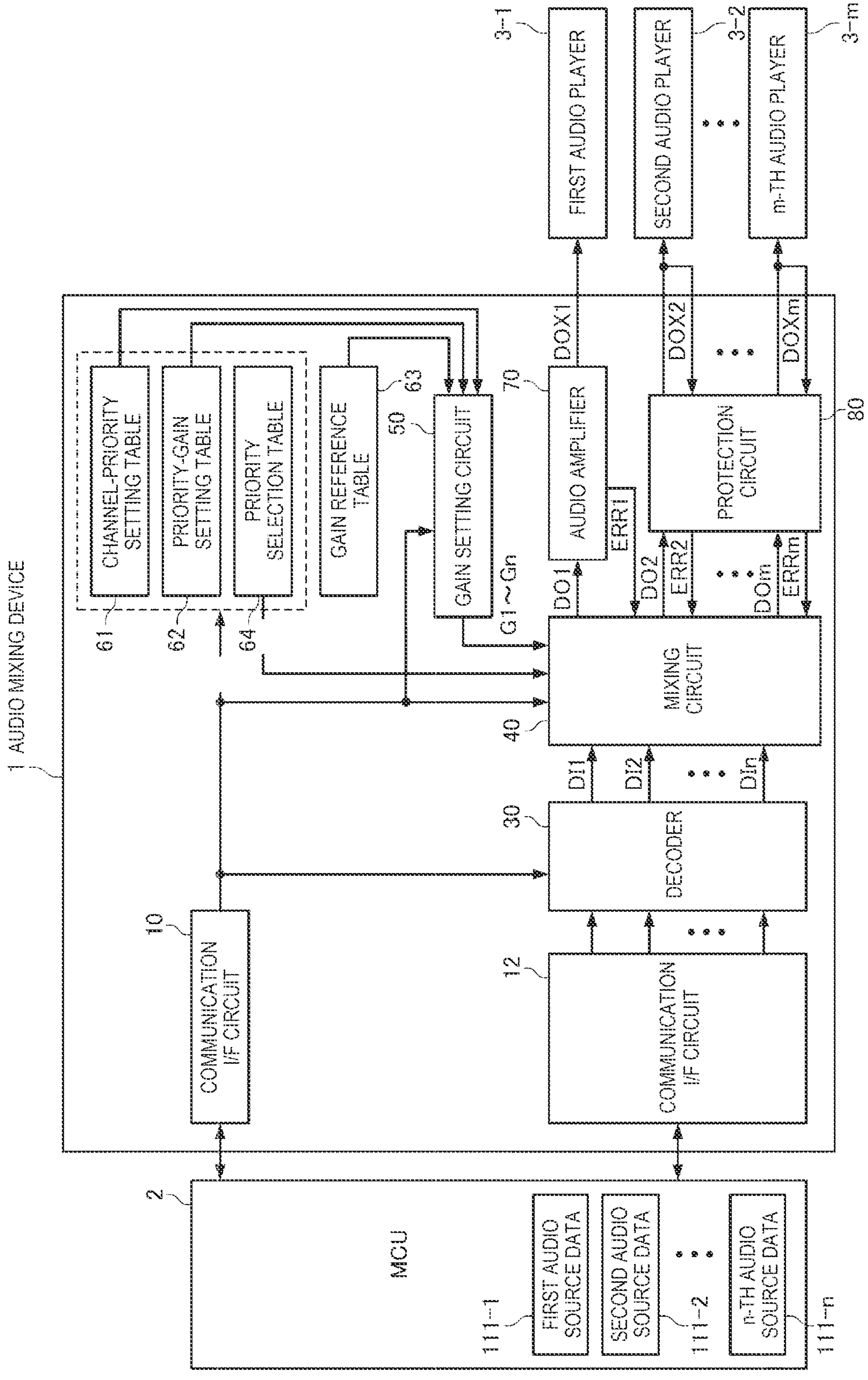
FIG. 9 is a diagram showing a configuration example of an audio mixing device according to a fourth embodiment.

FIG. 9 is a diagram showing a configuration example of the audio mixing device 1 according to the fourth embodiment. As shown in FIG. 9, the audio mixing device 1 according to the fourth embodiment includes a communication interface circuit 12 instead of the memory 20 with respect to audio mixing device 1 according to the second embodiment shown in FIG. 5.

The communication interface circuit 12 receives first to n-th audio source data 111-1 to 111-*n* from the external microcontroller 2 of the audio mixing device 1. The communication interface circuit 12 may be, for example, a TDM interface circuit or an I2S interface circuit. TDM is an abbreviation of time division multiplexing, and I2S is an abbreviation of inter-IC sound.

The microcontroller 2 transmits an audio play command for i-th audio source data 111-*i* to the communication interface circuit 10, and transmits the i-th audio source data 111-*i* to the communication interface circuit 12. The communication interface circuit 12 receives the i-th audio source data 111-*i* from the microcontroller 2, and outputs the received i-th audio source data 111-*i* to the i-th input channel of the decoder 30.

The microcontroller 2 may store at least a part of the first to n-th audio source data 111-1 to 111-*n* in a built-in memory (not shown). A memory (not shown) outside the microcontroller 2 may store at least a part of the first to n-th audio source data 111-1 to 111-*n*, and the microcontroller 2 may read the i-th audio source data 111-*i* from the memory and transmit the i-th audio source data 111-*i* to the communication interface circuit 12.

The decoder 30 decodes the i-th audio source data 101-*i* of the i-th input channel in response to the control signal that instructs the audio play for the i-th audio source data 101-*i* output from the communication interface circuit 10, and demodulates the i-th audio data DIi. As described above, the first to n-th audio source data 101-1 to 101-*n* are data that serves as the base of the first to n-th audio data DI1 to DIn.

Other configurations and functions of the audio mixing device 1 according to the fourth embodiment are the same as those of the audio mixing device 1 according to the second embodiment, and the description thereof will be omitted.

The audio mixing device 1 according to the fourth embodiment may include the communication interface circuit 12 instead of the memory 20 with respect to the audio mixing device 1 according to the first embodiment shown in FIG. 1. In the audio mixing device 1 according to the fourth embodiment, the communication interface circuit 10 may receive various commands from a plurality of microcontrollers 2, and the communication interface circuit 12 may receive a plurality of pieces of audio source data from the plurality of microcontrollers 2.

According to the audio mixing device 1 of the fourth embodiment described above, the same effects as those of the audio mixing device 1 according to the first embodiment or the second embodiment are achieved. Further, the audio mixing device 1 according to the fourth embodiment includes the communication interface circuit 12 that receives the first to n-th audio source data 111-1 to 111-*n* from the external microcontroller 2. Therefore, according to the audio mixing device 1 of the fourth embodiment, since the first to n-th audio source data 111-1 to 111-*n* can be received from the external microcontroller 2 via the communication interface circuit 12, it is not necessary to incorporate a memory for storing the first to n-th audio source data 111-1 to 111-*n*, and the circuit size can be reduced.

2. Electronic Device

Figure 10:
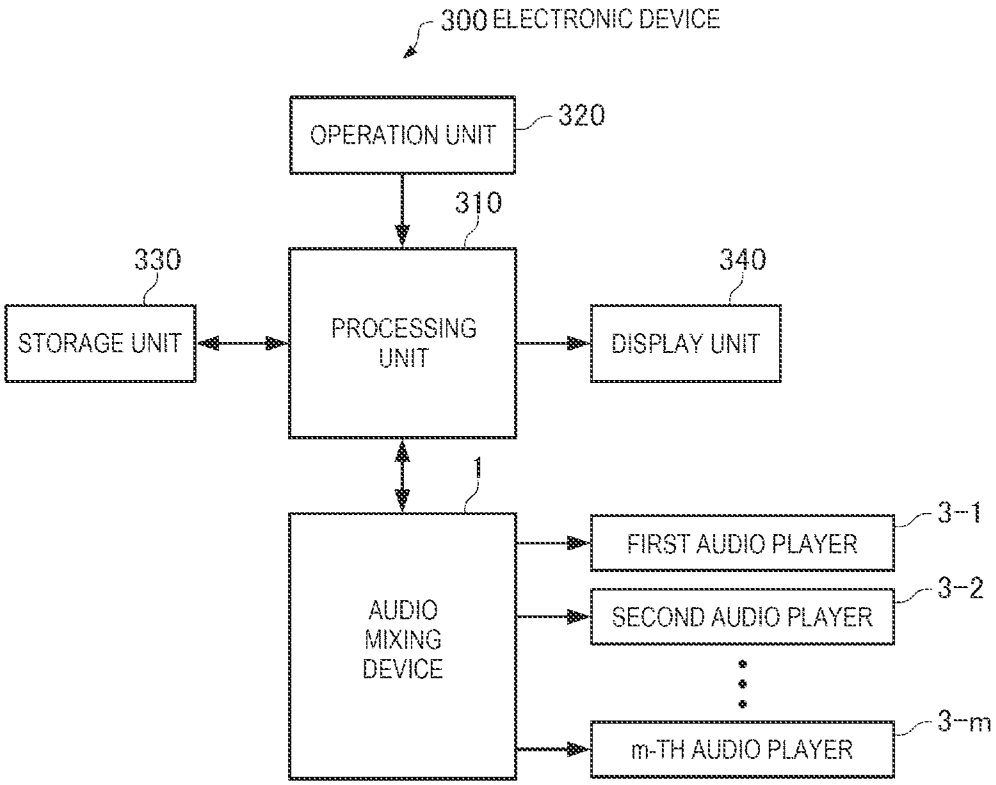
FIG. 10 is a functional block diagram of an electronic device according to the present embodiment.

FIG. 10 is a functional block diagram showing a configuration example of an electronic device according to the present embodiment using the audio mixing device 1 according to the present embodiment.

As shown in FIG. 10, an electronic device 300 according to the present embodiment includes the audio mixing device 1, the first to m-th audio players 3-1 to 3-*m*, a processing unit 310, an operation unit 320, a storage unit 330, and a display unit 340. The electronic device 300 according to the present embodiment may have a configuration in which some of the components in FIG. 10 are omitted or changed, or other components are added.

The processing unit 310 performs control processing and various data processing of each unit of the electronic device 300. For example, the processing unit 310 transmits various commands to the audio mixing device 1 to control an operation of the audio mixing device 1. The processing unit 310 performs various processes according to an operation signal from the operation unit 320, a process of transmitting a display signal for displaying various kinds of information on the display unit 340, and the like. For example, the processing unit 310 may be the microcontroller 2 described above.

The operation unit 320 is an input device including an operation key, a button switch, and the like, and outputs an operation signal corresponding to an operation by a user to the processing unit 310.

The storage unit 330 stores programs, data, and the like for the processing unit 310 to perform various calculation processes and control processes. For example, the first to n-th audio source data may be stored in the storage unit 330, and the processing unit 310 may read the i-th audio source data from the first to n-th audio source data stored in the storage unit 330 and transmit the i-th audio source data to the audio mixing device 1. The storage unit 330 is implemented by, for example, a hard disk, a flexible disk, an MO, an MT, various memories, a CD-ROM, a DVD-ROM, or the like.

The display unit 340 is a display device configured with an LCD or the like, and displays various kinds of information based on an input display signal. The LCD is an abbreviation of liquid crystal display. The display unit 340 may be provided with a touch panel functioning as the operation unit 320.

The audio mixing device 1 generates the mixing signal DO1 based on various commands transmitted from the processing unit 310, and outputs the audio signal DOX1 corresponding to the mixing signal DO1 to the first audio player 3-1. The audio mixing device 1 generates the audio signals DO2 to DOm or the audio signals DOX2 to DOXm based on various commands transmitted from the processing unit 310, and outputs the audio signals DO2 to DOm or the audio signals DOX2 to DOXm to the second to m-th audio players 3-2 to 3-*m*. Accordingly, audio is played by the first to m-th audio players 3-1 to 3-*m*.

Various electronic devices are conceivable as such an electronic device 300, and examples thereof include: various home electric products such as warning device, rice cooker, IH cooking heater, vacuum cleaner, and washing machine; electronic timepiece; personal computers of mobile type, laptop type, tablet type, and the like; mobile terminals such as smartphones and cellphones; digital camera; inkjet discharge devices such as inkjet printer; storage area network devices such as router and switch; local area network device; mobile terminal base station device; television; video camera; video recorder; car navigation device; real time clock device; pager; electronic notebook; electronic dictionary; calculator; electronic game device; game controller; word processor; work station; television telephone; security television monitor; electronic binoculars; POS terminal; medical device such as electronic thermometer, blood pressure meter, blood sugar meter, electrocardiogram measuring device, ultrasonic diagnostic device, and electronic endoscope; fish finder; various measuring instruments; measuring devices of vehicles, aircrafts, and ships; flight simulator; head-mounted display; motion trace; motion tracking; motion controller; and pedestrian autonomous navigation device.

Figure 11:
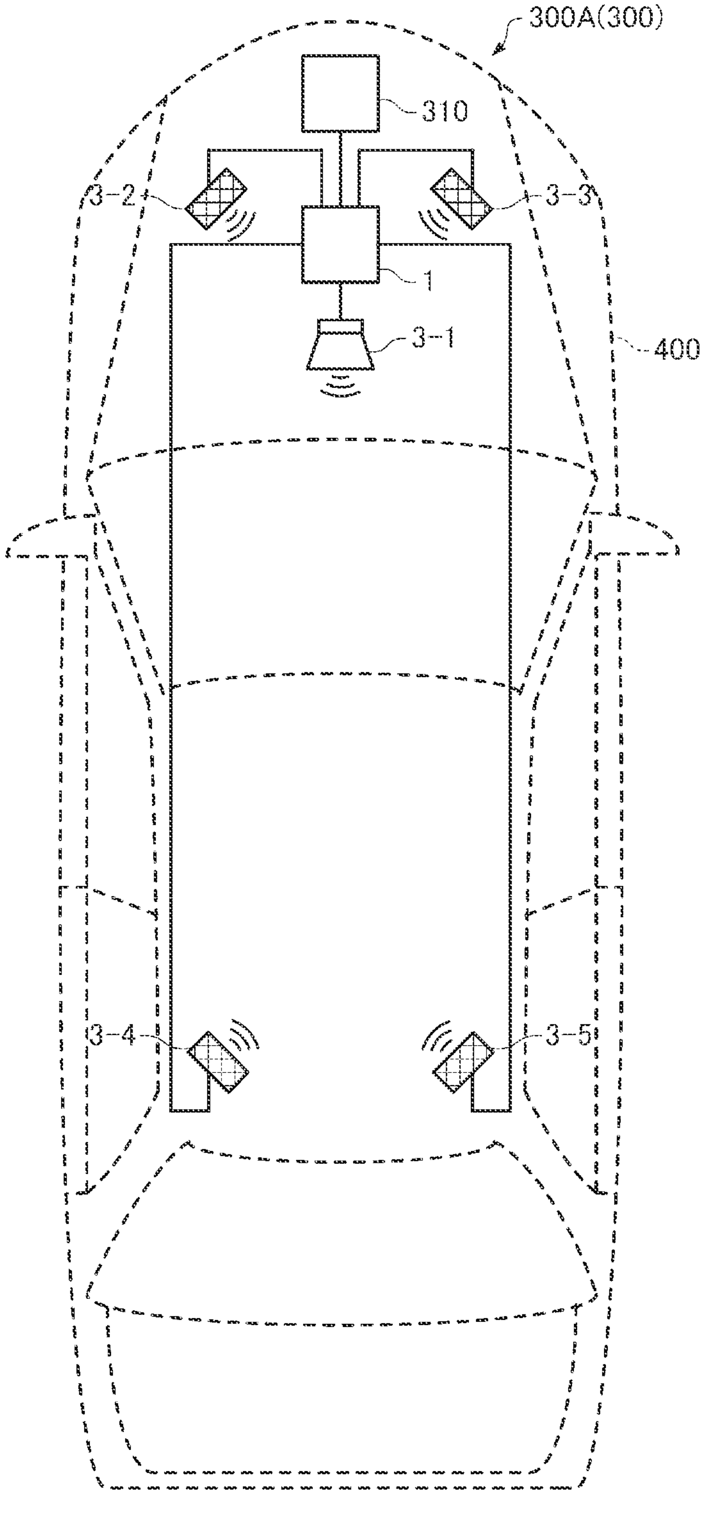
FIG. 11 is a diagram showing a configuration example of a warning device which is an example of the electronic device.

FIG. 11 is a diagram showing a configuration example of a warning device 300A which is an example of the electronic device 300. In FIG. 11, the components same as those in FIG. 10 are denoted by the same reference numerals. The warning device 300A shown in FIG. 11 is mounted on a vehicle 400. The first audio player 3-1 is a speaker, and the second to fifth audio players 3-2 to 3-5 are buzzers.

The processing unit 310 transmits play commands and the like of various kinds of audio to the audio mixing device 1 based on signals from various sensors (not shown). The various kinds of audio include, for example, a sound imitating human voice or a warning sound for notifying abnormality of a brake, engine oil, power steering, a brake override system, or the like, traveling with a door not fully closed, unsteady traveling, traveling without releasing a parking brake, not wearing a seat belt, being close to a vehicle ahead, and the like, and effect audios for notifying turn signal, hazard, reversing, and the like.

The audio mixing device 1 generates the mixing signal DO1 based on a part of the first to n-th audio source data corresponding to various kinds of audios based on a command from the processing unit 310, and outputs the audio signal DOX1 corresponding to the mixing signal DO1 to the first audio player 3-1.

The audio mixing device 1 generates audio signals DO2 to DO5 or audio signals DOX2 to DOX5 based on the other part of the first to n-th audio source data, and outputs the audio signals DO2 to DO5 or the audio signals DOX2 to DOX5 to the second to fifth audio players 3-2 to 3-5.

Accordingly, various kinds of audios are played by the first to fifth audio players 3-1 to 3-5.

Since the warning device 300A includes the audio mixing device 1 capable of outputting a plurality of pieces of audio data for which a play request has been received without delay, a plurality of pieces of audio for which play delay is not allowed due to high urgency can be simultaneously played without delay by the first audio player 3-1.

The present disclosure is not limited to the present embodiment, and various modifications can be made without departing from a gist of the present disclosure.

The embodiments and modifications described above are merely examples, and the present disclosure is not limited thereto. For example, the embodiments and the modifications can be combined as appropriate.

The present disclosure includes a configuration substantially the same as the configuration described in the embodiment, for example, a configuration having the same function, method, and result, or a configuration having the same purpose and effect. The present disclosure includes a configuration obtained by replacing a non-essential portion of the configuration described in the embodiment. The present disclosure includes a configuration having the same function and effect as the configuration described in the embodiment, or a configuration capable of achieving the same purpose. The present disclosure includes a configuration in which a known technique is added to the configuration described in the embodiment.

The following contents are derived from the embodiments and modifications described above.

An aspect of an audio mixing device includes: a gain setting circuit configured to set first to n-th gains based on a command input from the outside, n being an integer of 2 or more; and a mixing circuit configured to output a mixing signal obtained by mixing two or more of first to n-th multiplication data obtained by respectively multiplying first to n-th audio data by the first to n-th gains.

According to the audio mixing device, since a plurality of pieces of audio data respectively multiplied by a plurality of gains are mixed, it is possible to output the plurality of pieces of audio data without delay.

According to the audio mixing device, since the first to n-th gains are respectively set for the first to n-th audio data instead of the same gain, the user can easily distinguish the plurality of pieces of audio data to be simultaneously played.

In one aspect of the audio mixing device, the mixing circuit may include first to n-th input channels, an i-th input channel of the first to n-th input channels may be set with an i-th gain of the first to n-th gains, and the i-th input channel may be configured to receive i-th audio data of the first to n-th audio data.

In one aspect of the audio mixing device, during play of j-th audio data of the first to n-th audio data with a first value set to a j-th gain of the first to n-th gains, the gain setting circuit may set the j-th gain to a second value different from the first value when the gain setting circuit receives a command to start or stop play of k-th audio data having a higher priority than the j-th audio data.

According to the audio mixing device, when the priority of the j-th audio data during play increases or decreases, a play volume of the j-th audio data can be appropriately changed.

One aspect of the audio mixing device may further include: a memory configured to store first to n-th audio source data that serves as a base of the first to n-th audio data.

According to the audio mixing device, since it is not necessary to acquire the first to n-th audio source data from the outside, it is possible to advance the timing at which the play of the first to n-th audio data is started.

One aspect of the audio mixing device may further include: a memory interface circuit configured to receive first to n-th audio source data that serves as a base of the first to n-th audio data from an external memory that stores the first to n-th audio source data.

According to the audio mixing device, since the first to n-th audio source data can be received from the external memory via the memory interface circuit, it is not necessary to incorporate a memory for storing the first to n-th audio source data, and a circuit size can be reduced.

One aspect of the audio mixing device may further include: a communication interface circuit configured to receive, from an external microcontroller, first to n-th audio source data that serves as a base of the first to n-th audio data.

According to the audio mixing device, since the first to n-th audio source data can be received from the external microcontroller via the communication interface circuit, it is not necessary to incorporate a memory for storing the first to n-th audio source data, and the circuit size can be reduced.

One aspect of the audio mixing device may further include: an audio amplifier configured to convert the mixing signal into an audio signal and output the audio signal to a first audio player.

According to the audio mixing device, the first audio player can play a plurality of pieces of audio data without delay.

In one aspect of the audio mixing device, the audio amplifier may be configured to determine whether the audio signal is normal or abnormal, and output an abnormality detection signal to the mixing circuit when it is determined that the audio signal is abnormal, and the mixing circuit may be configured to output the mixing signal to any one of second to m-th audio players when the abnormality detection signal is input, m being an integer of 2 or more.

According to the audio mixing device, even when an abnormality occurs in the first audio player or the audio amplifier, one of the second to m-th audio players can play the plurality of pieces of audio data without delay.

In one aspect of the audio mixing device, the integer m may be an integer of 3 or more, and when the abnormality detection signal is input, the mixing circuit may select any one of the second to m-th audio players based on a priority selection table in which a priority for selecting each of the second to m-th audio players is designated, and output the mixing signal to the selected one of the second to m-th audio players.

According to the audio mixing device, even when an abnormality occurs in the first audio player or the audio amplifier, one of the second to m-th audio players having a higher priority can play the plurality of pieces of audio data without delay.

One aspect of an electronic device includes one aspect of the audio mixing device.

What is claimed is:

1. An audio mixing device comprising:

a gain setting circuit configured to set first to n-th gains based on a command input from the outside, n being an integer of 2 or more; and a mixing circuit configured to output a mixing signal obtained by mixing two or more of first to n-th multiplication data obtained by respectively multiplying first to n-th audio data by the first to n-th gains, wherein during play of j-th audio data of the first to n-th audio data with a first value set to a j-th gain of the first to n-th gains, the gain setting circuit sets the j-th gain to a second value different from the first value when the gain setting circuit receives a command to start or stop play of k-th audio data having a higher priority than the j-th audio data.

2. The audio mixing device according to claim 1, wherein the mixing circuit includes first to n-th input channels, an i-th input channel of the first to n-th input channels is set with an i-th gain of the first to n-th gains, and the i-th input channel is configured to receive i-th audio data of the first to n-th audio data.

3. The audio mixing device according to claim 1, further comprising:

a memory configured to store first to n-th audio source data that serves as a base of the first to n-th audio data.

4. The audio mixing device according to claim 1, further comprising:

a memory interface circuit configured to receive first to n-th audio source data that serves as a base of the first to n-th audio data from an external memory that stores the first to n-th audio source data.

5. The audio mixing device according to claim 1, further comprising:

a communication interface circuit configured to receive, from an external microcontroller, first to n-th audio source data that serves as a base of the first to n-th audio data.

6. The audio mixing device according to claim 1, further comprising:

an audio amplifier configured to convert the mixing signal into an audio signal and output the audio signal to a first audio player.

7. The audio mixing device according to claim 6, wherein the audio amplifier is configured to determine whether the audio signal is normal or abnormal, and output an abnormality detection signal to the mixing circuit when it is determined that the audio signal is abnormal, and the mixing circuit is configured to output the mixing signal to any one of second to m-th audio players when the abnormality detection signal is input, m being an integer of 2 or more.

8. The audio mixing device according to claim 7, wherein the integer m is an integer of 3 or more, and when the abnormality detection signal is input, the mixing circuit selects any one of the second to m-th audio players based on a priority selection table in which a priority for selecting each of the second to m-th audio players is designated, and outputs the mixing signal to the selected one of the second to m-th audio players.

9. An electronic device comprising the audio mixing device according to claim 1.

10. An audio mixing device comprising:

a gain setting circuit configured to set first to n-th gains based on a command input from the outside, n being an integer of 2 or more;

a mixing circuit configured to output a mixing signal obtained by mixing two or more of first to n-th multiplication data obtained by respectively multiplying first to n-th audio data by the first to n-th gains and configured to output the mixing signal to any one of second to m-th audio players when an abnormality detection signal is input, m being an integer of 2 or more; and an audio amplifier configured to convert the mixing signal into an audio signal and output the audio signal to a first audio player and configured to determine whether the audio signal is normal or abnormal, and output the abnormality detection signal to the mixing circuit when it is determined that the audio signal is abnormal.

11. The audio mixing device according to claim 10, wherein the mixing circuit includes first to n-th input channels, an i-th input channel of the first to n-th input channels is set with an i-th gain of the first to n-th gains, and the i-th input channel is configured to receive i-th audio data of the first to n-th audio data.

12. The audio mixing device according to claim 10, wherein during play of j-th audio data of the first to n-th audio data with a first value set to a j-th gain of the first to n-th gains, the gain setting circuit sets the j-th gain to a second value different from the first value when the gain setting circuit receives a command to start or stop play of k-th audio data having a higher priority than the j-th audio data.

13. The audio mixing device according to claim 10, further comprising:

a memory configured to store first to n-th audio source data that serves as a base of the first to n-th audio data.

14. The audio mixing device according to claim 10, further comprising:

a memory interface circuit configured to receive first to n-th audio source data that serves as a base of the first to n-th audio data from an external memory that stores the first to n-th audio source data.

15. The audio mixing device according to claim 10, further comprising:

a communication interface circuit configured to receive, from an external microcontroller, first to n-th audio source data that serves as a base of the first to n-th audio data.

16. The audio mixing device according to claim 10, wherein the integer m is an integer of 3 or more, and when the abnormality detection signal is input, the mixing circuit selects any one of the second to m-th audio players based on a priority selection table in which a priority for selecting each of the second to m-th audio players is designated, and outputs the mixing signal to the selected one of the second to m-th audio players.

17. An electronic device comprising the audio mixing device according to claim 10.

* * * * *